(12) United States Patent
Fujii et al.

(10) Patent No.: US 8,389,125 B2
(45) Date of Patent: Mar. 5, 2013

(54) FORMALDEHYDE SCAVENGER AND WOOD MATERIAL USING SAME

(75) Inventors: Ichiro Fujii, Tokyo (JP); Yuji Murata, Tokyo (JP); Seiji Ueda, Tokyo (JP); Shigeo Negishi, Tokyo (JP); Toshiharu Taguchi, Chiba (JP)

(73) Assignee: Idemitsu Technofine Co., Ltd., Tokyo (JP)

( * ) Notice: Subject to any disclaimer, the term of this patent is extended or adjusted under 35 U.S.C. 154(b) by 0 days.

(21) Appl. No.: 13/000,982

(22) PCT Filed: Jun. 26, 2009

(86) PCT No.: PCT/JP2009/002951
§ 371 (c)(1),
(2), (4) Date: Feb. 7, 2011

(87) PCT Pub. No.: WO2009/157210
PCT Pub. Date: Dec. 30, 2009

(65) Prior Publication Data
US 2011/0171482 A1    Jul. 14, 2011

(30) Foreign Application Priority Data

Jun. 27, 2008  (JP) .................................. 2008-168360

(51) Int. Cl.
*B32B 21/04*    (2006.01)

(52) U.S. Cl. ...................... 428/537.1; 428/524; 428/528; 528/256

(58) Field of Classification Search ............... 428/537.1, 428/524, 528; 528/256
See application file for complete search history.

(56) References Cited

U.S. PATENT DOCUMENTS 5,071,682 A * 12/1991 Moore .......................... 427/393
5,534,305 A *  7/1996 Fujiki et al. .................. 427/393

FOREIGN PATENT DOCUMENTS

| JP | 2007-313300 A | 6/2007 |
| JP | 2007-285107 | 7/2007 |
| JP | 2007-313300 | * 12/2007 |
| WO | 2007/083578 | 10/1995 |
| WO | WO2007/083578 | * 7/2007 |

* cited by examiner

*Primary Examiner* — Leszek Kiliman
(74) *Attorney, Agent, or Firm* — Kramer & Amado, P.C.

(57) ABSTRACT

Provided are a formaldehyde scavenger capable of providing excellent formaldehyde scavenging performance without discoloring a wood material and not reemitting formaldehyde, and a wood material using the same.
The formaldehyde scavenger contains urea, ammonium phosphate monobasic and ammonium phosphate dibasic. The formaldehyde scavenger contains urea, ammonium phosphate monobasic and ammonium phosphate dibasic preferably in a weight ratio of urea/ammonium phosphate monobasic/ammonium phosphate dibasic in the range of 5 to 45/0.5 to 15/1 to 20, and further preferably in a weight ratio of urea/ammonium phosphate monobasic/ammonium phosphate dibasic in the range of 10 to 35/1 to 10/2 to 15. The wood material is prepared by applying the formaldehyde scavenger thereto. The formaldehyde scavenger is preferably applied in the range of 1 to 50 g/m$^2$ by dry weight.

8 Claims, No Drawings

FORMALDEHYDE SCAVENGER AND WOOD MATERIAL USING SAME

TECHNICAL FIELD

The present invention relates to a formaldehyde scavenger scavenging formaldehyde emitted from furniture, building materials, heat insulators, buffer materials, insulation materials, interior materials for vehicles, etc., and a wood material using the same.

BACKGROUND ART

In manufacturing wood materials such as a plywood, a particle board and a fiberboard or in manufacturing furniture, building materials, etc. from the wood materials, a formaldehyde-based adhesive is sometimes used. In this case, formaldehyde liberated from such an adhesive is emitted from the wood building materials, or furniture, building materials, etc. However, recently, houses have become more and more airtight and accordingly formaldehyde causes health damage such as sick house syndrome.

Also in manufacturing interior materials for vehicles such as vehicle seats, the formaldehyde-based adhesive is sometimes used. In this case, a vehicle room is narrower than an ordinary house and much more airtight than an ordinary house and therefore severer damage is caused by formaldehyde.

Furthermore, other than these, heat insulators, buffer materials and insulation materials are manufactured by immobilizing glass wool, rock wool, etc. with the formaldehyde-based adhesive, and used as interior materials for general houses, buildings, factories, warehouses, etc. Formaldehyde is also emitted from these materials and pollutes living spaces slightly.

In the circumstances, a formaldehyde scavenger for scavenging and decomposing formaldehyde has been conventionally known. As the formaldehyde scavenger, urea is generally known.

Urea is an inexpensive formaldehyde scavenger, but a disadvantage thereof is that scavenged formaldehyde is reemitted by hydrolysis with heat or the like.

Furthermore, as the formaldehyde scavenger, formaldehyde scavengers containing ammonium phosphate monobasic and ammonium phosphate dibasic are known (see Japanese Patent Laid-Open No. 2007-191575).

However, such conventional formaldehyde scavengers containing ammonium phosphate monobasic and ammonium phosphate dibasic do not always provide sufficient formaldehyde scavenging performance.

Moreover, as the formaldehyde scavenger, an aldehyde deodorizing composition containing urea and at least one ammonium salt selected from ammonium phosphate monobasic, ammonium phosphate dibasic and ammonium sulfate is known (see Japanese Patent Laid-Open No. 2007-313300).

However, Japanese Patent Laid-Open No. 2007-313300 does not specifically describe that the aldehyde deodorizing composition is applied to wood materials.

DISCLOSURE OF THE INVENTION

Problems to be Solved by the Invention

In the circumstances, an object of the present invention is to provide a formaldehyde scavenger capable of providing excellent formaldehyde scavenging performance without discoloring a wood material and not reemitting formaldehyde.

Another object of the invention is to provide a wood material using the formaldehyde scavenger.

Means for Solving the Problems

To attain such objects, the formaldehyde scavenger of the present invention is characterized by containing urea, ammonium phosphate monobasic and ammonium phosphate dibasic. Since the formaldehyde scavenger of the present invention contains urea, ammonium phosphate monobasic and ammonium phosphate dibasic, it can provide excellent formaldehyde scavenging performance without discoloring a wood material, and at the same time suppress reemission of formaldehyde.

The formaldehyde scavenger of the present invention preferably contains urea, ammonium phosphate monobasic and ammonium phosphate dibasic in a weight ratio of urea/ammonium phosphate monobasic/ammonium phosphate dibasic in the range of 5 to 45/0.5 to 15/1 to 20. In the case where the weight ratio of urea/ammonium phosphate monobasic/ammonium phosphate dibasic is outside the range, when the formaldehyde scavenger is applied to a wood material, sometimes, discoloration of the wood material cannot be avoided; sufficient formaldehyde scavenging performance cannot be obtained; or reemission of formaldehyde cannot be suppressed.

The formaldehyde scavenger of the present invention further preferably contains urea, ammonium phosphate monobasic and ammonium phosphate dibasic in a weight ratio of urea/ammonium phosphate monobasic/ammonium phosphate dibasic in the range of 10 to 35/1 to 10/2 to 15. Since the formaldehyde scavenger of the present invention contains urea, ammonium phosphate monobasic, and ammonium phosphate dibasic within the weight-ratio range, particularly excellent formaldehyde scavenging performance can be obtained and the emission amount of formaldehyde can be significantly reduced.

Furthermore, the formaldehyde scavenger of the present invention is preferably prepared by dissolving or dispersing the formaldehyde scavenger in water. The formaldehyde scavenger of the present invention can be easily applied to a wood material by dissolving or dispersing it in water.

Furthermore, the wood material of the present invention is characterized by being prepared by applying the formaldehyde scavenger thereto. The wood material of the present invention is preferably prepared by applying the formaldehyde scavenger thereto so that the dry weight is in the range of 1 to 50 $g/m^2$. For such an application quantity of formaldehyde scavenger that the dry weight is less than 1 $g/m^2$, the effect of reducing the emission amount of formaldehyde cannot be always sufficiently obtained, whereas if the dry weight exceeds 50 $g/m^2$, powder of the formaldehyde scavenger remains on the surface of the wood material, and sometimes reduces the quality of external appearance.

BEST MODE FOR CARRYING OUT OF THE INVENTION

Next, embodiments of the invention will be described in more detail.

The formaldehyde scavenger of the embodiment contains urea, ammonium phosphate monobasic and ammonium phosphate dibasic. As urea herein, not only a reagent but also an industrial product can be used. Ammonium phosphate monobasic is represented by $NH_4H_2PO_4$ and also called ammonium dihydrogen phosphate. Furthermore, ammonium phosphate dibasic is represented by $(N_4)_2HPO_4$ and also called diammonium hydrogen phosphate.

As an ammonium phosphate, ammonium phosphate tribasic represented by $(NH_4)_3PO_4$ is further conceivable; however, ammonium phosphate tribasic is likely to decompose and difficult to use.

The formaldehyde scavenger of the embodiment preferably contains urea, ammonium phosphate monobasic and ammonium phosphate dibasic in a weight ratio of urea/ammonium phosphate monobasic/ammonium phosphate dibasic in the range of 5 to 45/0.5 to 15/1 to 20, and further preferably in a weight ratio of urea/ammonium phosphate monobasic/ammonium phosphate dibasic in the range of 10 to 35/1 to 10/2 to 15. Since the formaldehyde scavenger of the embodiment contains urea, ammonium phosphate monobasic and ammonium phosphate dibasic in the range, when the formaldehyde scavenger is applied to a wood material, such as for furniture and a building material, excellent formaldehyde scavenging performance can be obtained without discoloring the wood material, and at the same time, reemission of formaldehyde can be suppressed.

The formaldehyde scavenger of the embodiment may contain another known formaldehyde scavenger and deodorant as long as the formaldehyde scavenging performance is not damaged. Various compound agents may be added including a surfactant, a preservative, an antibacterial agent, an antifungal agent, an insect repellent, an anti-termite agent, an antioxidant, a UV ray absorbent, an antistatic agent, a flame retarder, a rust preventing agent, a dye, a pigment, a dispersant, a defoaming agent, an antifreezing agent, a metal salt of a weak acid, a metallic halide, an expander, a filler, a synthetic resin emulsion and a water soluble resin.

Examples of the known formaldehyde deodorant may include perlite, zeolite, silica gel, activated carbon, ethylene urea, a conjugate of ferrous sulfate and L-ascorbate, a hydrazide compound, ammonium chloride, ammonium sulfate, ammonium nitrate, sodium sulfite, sodium hydrogen sulfite and caustic soda. Furthermore, examples of the surfactant may include a nonionic surfactant, a sulfonic acid type anionic surfactant, a sulfate type anionic surfactant and a phosphate type anionic surfactant. Furthermore, examples of the metal salt of a weak acid may include sodium acetate, sodium stearate and sodium carbonate. Furthermore, examples of the metallic halide may include calcium chloride and magnesium chloride. Furthermore, examples of the expander and filler may include crystalline silica, aluminum hydroxide and alumina.

Furthermore, examples of the synthetic resin emulsion may include a vinyl acetate polymer emulsion, an ethylene-vinyl acetate copolymer emulsion, vinyl acetate-versatate copolymer emulsion, an ethylene-vinyl acetate-vinyl chloride copolymer emulsion, an ethylene-vinyl acetate-acrylate copolymer emulsion, an acrylate polymer emulsion, an acrylate-styrene copolymer emulsion, a vinyl chloride polymer emulsion, an urethane polymer emulsion, a silicone polymer emulsion, an epoxy polymer emulsion, a wax emulsion, a styrene-butadiene copolymerized latex and a silylated urethane copolymer emulsion.

The formaldehyde scavenger of the embodiment is dissolved in water, to prepare an aqueous solution having a concentration range of e.g., 6.5 to 50 wt % and then applied to wood materials such as furniture and building materials, and interior materials for vehicles, etc. In this case, it is preferred to apply the formaldehyde scavenger to the wood material so that the dry weight is in the range of 1 to 50 $g/m^2$. If the formaldehyde scavenger is applied to the wood material so as to satisfy the dry weight in the range, excellent formaldehyde scavenging performance can be obtained without discoloring the wood material, and at the same time, reemission of formaldehyde can be suppressed.

Note that as a phosphate, sodium phosphate monobasic to tribasic, potassium phosphate monobasic to tribasic and the like may be mentioned corresponding to ammonium phosphate monobacid to tribasic. However, if a phosphate except ammonium phosphate monobasic and ammonium phosphate dibasic is used singly or in combination with urea, when it is applied to a wood material, discoloration of the wood material cannot be avoided or sufficient formaldehyde scavenging performance cannot be obtained, or reemission of formaldehyde cannot be suppressed.

Furthermore, the formaldehyde scavenger of the embodiment can be prepared in the form of powder or an aqueous solution or fluid dispersion of the powder. Furthermore, the formaldehyde scavenger may be blended with an appropriate synthetic resin to obtain a deodorant resin composition. Examples of the synthetic resin may include thermoplastic synthetic resins such as a polyvinyl chloride resin, a polyolefin resin (a polyethylene resin, a polypropylene resin, etc.), a methacrylic resin, an ABS resin, a vinyl idene chloride resin, a vinyl acetate resin, a polyimide, a polyacetal, a polycarbonate, a modified polyphenylene ether polysulfone and a polyphenylene ether polysulfide; synthesis rubber resins such as a CR resin, an SBR resin and an NBR resin; thermosetting synthetic resins such as an epoxy resin, a xylene resin, a guanamine resin, a diallylphthalate resin, a vinyl ester resin, a phenol resin, an unsaturated polyester resin, a furan resin, a polyimide resin, a polyurethane resin, a maleate resin, a silicate resin, a melamine resin and a urea resin; and aqueous polymers such as a polyvinyl alcohol (PVA), an acetoacetylated polyvinyl alcohol, a carboxyl-group modified polyvinyl alcohol, carboxymethylcellulose (CMC), methylcellulose (MC), starch, dextrin, cornstarch, wheat flour, an isobutylene-maleic anhydride copolymer resin and a polyacrylamide resin.

Next, Examples and Comparative Examples of the present invention will be described.

EXAMPLE 1

In the present Example, urea (10 parts by weight), ammonium phosphate monobasic (5 parts by weight) and ammonium phosphate dibasic (5 parts by weight) were mixed to prepare a formaldehyde scavenger.

Next, the formaldehyde scavenger (20 parts by weight) obtained by the present Example was dissolved in ion-exchanged water (80 parts by weight) to prepare an aqueous formaldehyde scavenger solution having a concentration of 20 wt %.

Then, performance evaluation of the formaldehyde scavenger of the example was performed as follows.

As the performance evaluation, the formaldehyde emission amount and scavenging rate of a wood material to which the formaldehyde scavenger was applied were measured. First, the aqueous formaldehyde scavenger solution was applied onto both surfaces of test material A, which was previously prepared as a wood material, so that the aqueous formaldehyde scavenger solution was applied to each of the surfaces in an application quantity of 22.2 $g/m^2$, and thereafter air-dried for 1 to 3 days. The resultant test material A was a wood material to a surface of which 4.4 $g/m^2$ by dry weight of the formaldehyde scavenger was applied.

Next, the formaldehyde emission amount of test material A to which the formaldehyde scavenger was applied was measured by the JAS glass desiccator method and a scavenging rate was calculated in accordance with the following expression (1).

$$\text{Scavenging rate}(\%) = (Fc - Fd)/Fc \times 100 \quad (1)$$

where, Fc represents the formaldehyde emission amount of test material A to which a formaldehyde scavenger is not applied, and Fd represents the formaldehyde emission amount of test material A to which the formaldehyde scavenger is applied. Note that Fc was 1.577 mg/L.

The formaldehyde emission amount and scavenging rate of test material A to which the formaldehyde scavenger is applied are shown in Table 1.

Test material A is a plywood prepared by bonding a yellow lauan of 0.7 mm in thickness to both surfaces of yellow lauan of 1.7 mm in thickness with a melamine-formaldehyde resin based adhesive. The melamine-formaldehyde resin based adhesive has a composition consisting of a melamine-formaldehyde resin (100 parts by weight), wheat flour (Akahana, 18 parts by weight), water (10 parts by weight) and ammonium chloride (1 part by weight). Furthermore, the melamine-formaldehyde resin has a nonvolatile content of 59 wt %, a viscosity of 0.22 Pa·s (23° C.), pH of 9.0, a density of 1.200 g/cm$^3$, gelatinization time of 15 minutes (60° C.) and free formaldehyde of 0.5 wt %.

The plywood was adhered by applying the melamine-formaldehyde resin based adhesive between each of the yellow lauans and another so that the application quantity was 311 g/m$^2$, and thereafter, applying cold pressing at 1 MPa for 30 minutes and hot pressing at 1 MPa for 60 seconds at 125° C., thereby bonding the yellow lauans. As a result, the formaldehyde emission amount from the plywood became F**, in terms of the formaldehyde emission amount standard defined by the JAS (average value, 1.5 mg/L; maximum value, 2.1 mg/L).

Furthermore, as the performance evaluation, the formaldehyde scavenger was checked for the presence or absence of reemission of formaldehyde. First, the aqueous formaldehyde scavenger solution was applied to nonwoven cloth made of a polyethylene terephthalate resin (manufactured by Toyobo Co., Ltd.; trade name, H3501AD) so that the application quantity was 30 g/m$^2$ per surface, and then dried at 80° C. for 30 minutes. Next, the nonwoven cloth was cut into pieces of 9 cm squares to prepare test pieces.

Next, the test piece was placed in a 2.5 L-conical flask having a formaldehyde concentration of 40 to 50 ppm and allowed to stand still for 2 hours. During the stand-still, the concentration of formaldehyde in the conical flask was measured every one hour to confirm that formaldehyde of the conical flask was completely absorbed by the formaldehyde scavenger applied to the test piece. The formaldehyde concentration was measured by using a detector tube gas measuring apparatus (manufactured by Gastec Service, Inc.; trade name, GV-100S type) and a detector tube for formaldehyde (manufactured by Gastec Service, Inc.; trade name, 91L; measuring range, 0.1 to 40.0 ppm; or trade name, 91LL; measuring range, 0.05 to 1.0 ppm).

Next, the test piece absorbing formaldehyde was transferred to a 0.5 L-conical flask and dried by a dryer at 40° C. for 2 hours, and then the formaldehyde concentration in the conical flask was measured by the detector tube to determine the presence or absence of formaldehyde reemission from the test piece. The results are shown in Table-1. In Table 1, G indicates the absence of reemission and P indicates the presence of reemission.

Furthermore, as the performance evaluation, a wood material to which the formaldehyde scavenger was applied was checked for the presence or absence of discoloration. First, the aqueous formaldehyde scavenger solution was applied to a surface of beech sliced veneer, which was previously prepared as test material B, so that the aqueous formaldehyde scavenger solution was applied to the surface in an application quantity of 33.3 g/m$^2$. Next, on the coated surface of test material B, a lauan plywood of 3 mm in thickness was superposed, and water was applied onto the exposed surface of each of test material B and the lauan plywood so that the application quantity was 22.2 g/m$^2$. Next, a laminate, which was formed by superposing test material B and the lauan plywood, was placed in a polyethylene bag, sealed off and heated by a dryer at 60° C. for one day. Next, test material B was taken out from the bag and the presence or absence of staining (discoloration) of the wood material on the coated surface of test material B was visually determined. In Table 1, G indicates the absence of discoloration and P indicates the presence of discoloration.

Test material B is a plywood prepared by applying a liquid glue, which was prepared by mixing 100 parts by weight of a first adhesive (manufactured by OSHIKA Co. Ltd.; trade name, fancy bond FB521-2), 50 parts by weight of a second adhesive (manufactured by OSHIKA Co. Ltd.; trade name, fancy bond FB520-1), 50 parts by weight of wheat flour (blue wave), water (30 parts by weight) and ammonium chloride (0.5 parts by weight), to a lauan plywood of 3 mm in thickness so that the application quantity was 111 g/m$^2$ and thereafter, bonding a beech sliced veneer of 0.15 mm in thickness thereto, and applying hot pressuring at 120° C. at 0.7 MPa for 50 seconds, thereby permitting them to adhere.

EXAMPLE 2

In the present Example, an aqueous formaldehyde scavenger solution was prepared in exactly the same manner as in Example 1 except that urea (10 parts by weight), ammonium phosphate monobasic (7 parts by weight) and ammonium phosphate dibasic (3 parts by weight) were mixed to prepare a formaldehyde scavenger.

Next, the performance evaluation of the formaldehyde scavenger was performed in exactly the same manner as in Example 1 except that the aqueous formaldehyde scavenger solution obtained by the present Example was used. The results are shown in Table 1.

EXAMPLE 3

In the present Example, an aqueous formaldehyde scavenger solution was prepared in exactly the same manner as in Example 1 except that urea (10 parts by weight), ammonium phosphate monobasic (2 parts by weight) and ammonium phosphate dibasic (8 parts by weight) were mixed to prepare a formaldehyde scavenger.

Next, the performance evaluation of the formaldehyde scavenger was performed in exactly the same manner as in Example 1 except that the aqueous formaldehyde scavenger solution obtained by the present Example was used. The results are shown in Table 1.

Comparative Example 1

In the present Comparative Example, an aqueous formaldehyde scavenger solution was prepared in exactly the same manner as in Example 1 except that urea (20 parts by weight) alone was used to prepare a formaldehyde scavenger.

Next, the performance evaluation of the formaldehyde scavenger was performed in exactly the same manner as in Example 1 except that the aqueous formaldehyde scavenger solution obtained by the present Comparative Example was used. The results are shown in Table 1.

Comparative Example 2

In the present Comparative Example, ammonium phosphate monobasic (5 parts by weight) and ammonium phosphate dibasic (5 parts by weight) alone were mixed to prepare a formaldehyde scavenger. Next, the formaldehyde scavenger (10 parts by weight) obtained in the present Comparative Example was dissolved in ion-exchanged water (90 parts by weight) to prepare an aqueous formaldehyde scavenger solution having a concentration of 10 wt %.

Next, the performance evaluation of the formaldehyde scavenger was performed in exactly the same manner as in Example 1 except that the aqueous formaldehyde scavenger solution obtained by the present Comparative Example was used and that the aqueous formaldehyde scavenger solution was applied to test material A so that the application quantity of formaldehyde scavenger was 2.2 g/m$^2$. The results are shown in Table 1.

Comparative Example 3

In the present Comparative Example, an aqueous formaldehyde scavenger solution was prepared in exactly the same manner as in Comparative Example 2 except that ammonium phosphate monobasic (7 parts by weight) and ammonium phosphate dibasic (3 parts by weight) alone were mixed to prepare a formaldehyde scavenger.

Next, the performance evaluation of the formaldehyde scavenger was performed in exactly the same manner as in Comparative Example 2 except that the aqueous formaldehyde scavenger solution obtained by the present Comparative Example was used. The results are shown in Table 1.

Comparative Example 4

In the present Comparative Example, an aqueous formaldehyde scavenger solution was prepared in exactly the same manner as in Comparative Example 2 except that ammonium phosphate monobasic (2 parts by weight) and ammonium phosphate dibasic (8 parts by weight) alone were mixed to prepare a formaldehyde scavenger.

Next, the performance evaluation of the formaldehyde scavenger was performed in exactly the same manner as in Comparative Example 2 except that the aqueous formaldehyde scavenger solution obtained by the present Comparative Example was used. The results are shown in Table 1.

TABLE 1

|  | Formaldehyde emission amount (mg/L) | Formaldehyde scavenging rate (%) | Formaldehyde reemission | Discoloration |
| --- | --- | --- | --- | --- |
| Example 1 | 0.547 | 65.3 | G | G |
| Example 2 | 0.463 | 70.6 | G | G |
| Example 3 | 0.562 | 64.4 | G | G |
| Comparative Example 1 | 0.779 | 50.6 | P | G |
| Comparative Example 2 | 1.375 | 12.8 | G | G |
| Comparative Example 3 | 1.467 | 7.0 | G | G |
| Comparative Example 4 | 1.265 | 19.8 | G | G |

The formaldehyde scavengers of Examples 1 to 3 each consist of urea, ammonium phosphate monobasic and ammonium phosphate dibasic, and the total of the three compounds is 20 parts by weight. On the other hand, the formaldehyde scavenger of Comparative Example 1 contains neither ammonium phosphate monobasic nor ammonium phosphate dibasic, and consists of urea (20 parts by weight) alone. Furthermore, the formaldehyde scavengers of Comparative Examples 2 to 4 each do not contain urea and consist of ammonium phosphate monobasic and ammonium phosphate dibasic and the total of the two compounds is 10 parts by weight.

From Table 1, according to the formaldehyde scavengers of Examples 1 to 3, it is clear that when they were applied to the wood material of F**, excellent formaldehyde scavenging performance can be obtained without discoloring wood material, and at the same time, reemission of formaldehyde can be suppressed. On the other hand, according to the formaldehyde scavenger of Comparative Example 1, it is clear that the wood material is not discolored, but the formaldehyde scavenging performance is lower than that of the formaldehyde scavengers of Examples 1 to 3, and at the same time, reemission of formaldehyde cannot be suppressed. Furthermore, according to the formaldehyde scavengers of Comparative Examples 2 to 4, it is clear that a wood material is not discolored and reemission of formaldehyde can be suppressed, but the formaldehyde scavenging performance is much lower than that of the formaldehyde scavengers of Examples 1 to 3.

EXAMPLE 4

In the present Example, urea (10 parts by weight), ammonium phosphate monobasic (1 part by weight) and ammonium phosphate dibasic (4 parts by weight) were mixed to prepare a formaldehyde scavenger. Next, the formaldehyde scavenger (15 parts by weight) obtained by the present Example was dissolved in ion-exchanged water (85 parts by weight) to prepare an aqueous formaldehyde scavenger solution having a concentration of 15 wt %.

Next, the performance evaluation of the formaldehyde scavenger was performed in exactly the same manner as in Example 1 except that the aqueous formaldehyde scavenger solution obtained by the present Example was used and that the aqueous formaldehyde scavenger solution was applied to test material A so that the application quantity of formaldehyde scavenger was 3.3 g/m$^2$ by dry weight. The results are shown in Table 2.

EXAMPLE 5

In the present Example, an aqueous formaldehyde scavenger solution was prepared in exactly the same manner as in Example 4 except that urea (10 parts by weight), ammonium phosphate monobasic (3.5 parts by weight) and ammonium phosphate dibasic (1.5 parts by weight) were mixed to prepare a formaldehyde scavenger.

Next, the performance evaluation of the formaldehyde scavenger was performed in exactly the same manner as in Example 4 except that the aqueous formaldehyde scavenger solution obtained by the present Example was used. The results are shown in Table 2.

Comparative Example 5

In the present Comparative Example, an aqueous formaldehyde scavenger solution was prepared in exactly the same manner as in Example 4 except that urea (15 parts by weight) alone was used to prepare a formaldehyde scavenger.

Next, the performance evaluation of the formaldehyde scavenger was performed in exactly the same manner as in Example 4 except that the aqueous formaldehyde scavenger solution obtained by the present Comparative Example was used. The results are shown in Table 2.

TABLE 2

|  | Formaldehyde emission amount (mg/L) | Formaldehyde scavenging rate (%) | Formaldehyde reemission | Discoloration |
|---|---|---|---|---|
| Example 4 | 0.646 | 59.0 | G | G |
| Example 5 | 0.532 | 66.3 | G | G |
| Comparative Example 5 | 0.874 | 44.6 | P | G |

The formaldehyde scavengers of Examples 4 and 5 each consist of urea, ammonium phosphate monobasic and ammonium phosphate dibasic, and the total of the three compounds is 15 parts by weight. On the other hand, the formaldehyde scavenger of Comparative Example 5 contains neither ammonium phosphate monobasic nor ammonium phosphate dibasic and consists of urea (15 parts by weight) alone.

From Table 2, according to the formaldehyde scavengers of Examples 4 and 5, it is clear that when they were applied to the wood material of F**, excellent formaldehyde scavenging performance can be obtained without discoloring the wood material, and at the same time, reemission of formaldehyde can be suppressed. On the other hand, according to the formaldehyde scavenger of Comparative Example 5, it is clear that the wood material is not discolored, but the formaldehyde scavenging performance is lower than that of the formaldehyde scavengers of Examples 4 and 5, and at the same time, reemission of formaldehyde cannot be suppressed.

EXAMPLE 6

In the present Example, urea (10 parts by weight), ammonium phosphate monobasic (3 parts by weight) and, ammonium phosphate dibasic (12 parts by weight) were mixed to prepare a formaldehyde scavenger. Next, formaldehyde scavenger (25 parts by weight) obtained by the present Example was dissolved in ion-exchanged water (75 parts by weight) to prepare an aqueous formaldehyde scavenger solution having a concentration of 25 wt %.

Next, the performance evaluation of the formaldehyde scavenger was performed in exactly the same manner as in Example 1 except that the aqueous formaldehyde scavenger solution obtained by the present Example was used and that the aqueous formaldehyde scavenger solution was applied to test material A so that the application quantity of formaldehyde scavenger was 5.5 g/m$^2$ by dry weight. The results are shown in Table 3.

EXAMPLE 7

In the present Example, urea (10 parts by weight), ammonium phosphate monobasic (10 parts by weight) and ammonium phosphate dibasic (10 parts by weight) were mixed to prepare a formaldehyde scavenger. Next, the formaldehyde scavenger (30 parts by weight) obtained by the present Example was dissolved in ion-exchanged water (70 parts by weight) to prepare an aqueous formaldehyde scavenger solution having a concentration of 30 wt %.

Next, the performance evaluation of the formaldehyde scavenger was performed in exactly the same manner as in Example 1 except that the aqueous formaldehyde scavenger solution obtained by the present Example was used and that the aqueous formaldehyde scavenger solution was applied to test material A so that the application quantity of formaldehyde scavenger was 6.6 g/m$^2$ by dry weight. The results are shown in Table 3.

TABLE 3

|  | Formaldehyde emission amount (mg/L) | Formaldehyde scavenging rate (%) | Formaldehyde reemission | Discoloration |
|---|---|---|---|---|
| Example 6 | 0.539 | 65.8 | G | G |
| Example 7 | 0.608 | 61.4 | G | G |

The formaldehyde scavenger of Example 6 consists of urea, ammonium phosphate monobasic and ammonium phosphate dibasic, and the total of the three compounds is 25 parts by weight. Furthermore, the formaldehyde scavenger of Example 7 has a total of the three compounds of 30 parts by weight.

From Table 3, according to the formaldehyde scavengers of Examples 6 and 7, it is clear that when they were applied to the wood material of F**, excellent formaldehyde scavenging performance can be obtained without discoloring the wood material, and at the same time, reemission of formaldehyde can be suppressed.

EXAMPLE 8

In the present Example, urea (30 parts by weight), ammonium phosphate monobasic (5 part by weight) and ammonium phosphate dibasic (5 parts by weight) were mixed to prepare a formaldehyde scavenger. Next, the formaldehyde scavenger (40 parts by weight) obtained by the present Example was dissolved in ion-exchanged water (60 parts by weight) to prepare an aqueous formaldehyde scavenger solution having a concentration of 40 wt %.

Next, the performance evaluation of the formaldehyde scavenger was performed in exactly the same manner as in Example 1 except that the aqueous formaldehyde scavenger solution obtained by the present example was used and that the aqueous formaldehyde scavenger solution was applied to test material A so that the application quantity of formaldehyde scavenger was 8.8 g/m$^2$ by dry weight. The results are shown in Table 4.

EXAMPLE 9

In the present Example, an aqueous formaldehyde scavenger solution was prepared in exactly the same manner as in Example 8 except that urea (30 parts by weight), ammonium phosphate monobasic (7 parts by weight) and ammonium phosphate dibasic (3 parts by weight) were mixed to prepare a formaldehyde scavenger.

Next, the performance evaluation of the formaldehyde scavenger was performed in exactly the same manner as in Example 8 except that the aqueous formaldehyde scavenger solution obtained by the present Example was used. The results are shown in Table 4.

EXAMPLE 10

In the present Example, an aqueous formaldehyde scavenger solution was prepared in exactly the same manner as in Example 8 except that urea (30 parts by weight), ammonium phosphate monobasic (2 parts by weight) and ammonium phosphate dibasic (8 parts by weight) were mixed to prepare a formaldehyde scavenger.

Next, the performance evaluation of the formaldehyde scavenger was performed in exactly the same manner as in Example 8 except that the aqueous formaldehyde scavenger solution obtained by the present Example was used. The results are shown in Table 4.

Comparative Example 6

In the present Comparative Example, an aqueous formaldehyde scavenger solution was prepared in exactly the same manner as in Example 8 except that urea (40 parts by weight) alone was used to prepare a formaldehyde scavenger.

Next, the performance evaluation of the formaldehyde scavenger was performed in exactly the same manner as in Example 8 except that the aqueous formaldehyde scavenger solution obtained by the present Comparative Example was used. The results are shown in Table 4.

Comparative Example 7

In the present Comparative Example, an aqueous formaldehyde scavenger solution was prepared in exactly the same manner as in Example 8 except that urea (30 parts by weight) and ammonium phosphate dibasic (10 parts by weight) alone were mixed to prepare a formaldehyde scavenger.

Next, the performance evaluation of the formaldehyde scavenger was performed in exactly the same manner as in Example 8 except that the aqueous formaldehyde scavenger solution obtained by the present Comparative Example was used. The results are shown in Table 4.

TABLE 4

| | Formaldehyde emission amount (mg/L) | Formaldehyde scavenging rate (%) | Formaldehyde reemission | Discoloration |
|---|---|---|---|---|
| Example 8 | 0.334 | 78.8 | G | G |
| Example 9 | 0.395 | 75.0 | G | G |
| Example 10 | 0.364 | 76.9 | G | G |
| Comparative Example 6 | 0.623 | 60.5 | P | G |
| Comparative Example 7 | 0.353 | 77.6 | G | P |

The formaldehyde scavengers of Examples 8 to 10 each consist of urea, ammonium phosphate monobasic and ammonium phosphate dibasic, and the total of the three compounds is 40 parts by weight. On the other hand, the formaldehyde scavenger of Comparative Example 6 contains neither ammonium phosphate monobasic nor ammonium phosphate dibasic and consists of urea (40 parts by weight) alone. Furthermore, the formaldehyde scavenger of Comparative Example 7 does not contain ammonium phosphate monobasic and consists of urea and ammonium phosphate dibasic, and the total of the two compounds is 40 parts by weight.

From Table 4, according to the formaldehyde scavengers of Examples 8 to 10, it is clear that when they were applied to the wood material of F**, excellent formaldehyde scavenging performance can be obtained without discoloring the wood material, and at the same time, reemission of formaldehyde can be suppressed. On the other hand, according to the formaldehyde scavenger of Comparative Example 6, it is clear that the wood material is not discolored, but the formaldehyde scavenging performance is lower than that of the formaldehyde scavengers of Examples 8 to 10, and at the same time, reemission of formaldehyde cannot be suppressed. Furthermore, according to the formaldehyde scavenger of Comparative Example 7, it is clear that excellent formaldehyde scavenging performance equivalent to that of Examples 8 to 10 can be obtained, and at the same time, reemission of formaldehyde can be suppressed, but discoloration of the wood material cannot be prevented.

EXAMPLE 11

In the present Example, an aqueous formaldehyde scavenger solution was prepared in exactly the same manner as in Example 2.

Next, the formaldehyde emission amount and scavenging rate of a wood material to which a formaldehyde scavenger was applied were measured in exactly the same manner as in Example 1 except that the aqueous formaldehyde scavenger solution obtained by the present Example was used, and that the aqueous formaldehyde scavenger solution was applied to test material C in place of test material A as the wood material. Note that the aforementioned Fc was 0.478 mg/L.

Test material C is a plywood having the same structure as in test material A except that the melamine-formaldehyde resin based adhesive used in preparing test material A is replaced by a melamine-formaldehyde resin based adhesive, which contains urea (7 parts by weight) in addition to the composition of the melamine-formaldehyde resin based adhesive. The plywood, which was bonded in exactly the same manner as in the test material mentioned above, had a formaldehyde emission amount of F** in terms of the formaldehyde emission amount standard (average value, 0.5 mg/L; maximum value, 0.7 mg/L) defined by the JAS.

Next, the presence and absence of formaldehyde remission of the formaldehyde scavenger and the presence and absence of staining (discoloration) of the wood material to which the formaldehyde scavenger was applied were determined in exactly the same manner as in Example 1. The results are shown in Table 5.

EXAMPLE 12

In the present Example, an aqueous formaldehyde scavenger solution was prepared in exactly the same manner as in Example 3.

Next, the performance evaluation of the formaldehyde scavenger was performed in exactly the same manner as in Example 11 except that the aqueous formaldehyde scavenger solution obtained by the present Example was used. The results are shown in Table 5.

Comparative Example 8

In the present Comparative Example, an aqueous formaldehyde scavenger solution was prepared in exactly the same manner as in Comparative Example 2.

Next, the performance evaluation of the formaldehyde scavenger was performed in exactly the same manner as in Example 11 except that the aqueous formaldehyde scavenger solution obtained by the present Comparative Example was used and that the aqueous formaldehyde scavenger solution was applied to test material C so that the application quantity of formaldehyde scavenger was 2.2 g/m² by dry weight. The results are shown in Table 5.

Comparative Example 9

In the present Comparative Example, an aqueous formaldehyde scavenger solution was prepared in exactly the same manner as in Comparative Example 4.

Next, the performance evaluation of the formaldehyde scavenger was performed in exactly the same manner as in Comparative Example 8 except that the aqueous formaldehyde scavenger solution obtained by the present Comparative Example was used. The results are shown in Table 5.

TABLE 5

| | Formaldehyde emission amount (mg/L) | Formaldehyde scavenging rate (%) | Formaldehyde reemission | Discoloration |
|---|---|---|---|---|
| Example 11 | 0.152 | 68.2 | G | G |
| Example 12 | 0.144 | 69.9 | G | G |
| Comparative Example 8 | 0.288 | 39.7 | G | G |
| Comparative Example 9 | 0.212 | 55.6 | G | G |

The formaldehyde scavengers of Examples 11 and 12 each consist of urea, ammonium phosphate monobasic and ammonium phosphate dibasic, and the total of the three compounds is 20 parts by weight. On the other hand, the formaldehyde scavengers of Comparative Examples 8 and 9 do not contain urea and consist of ammonium phosphate monobasic and ammonium phosphate dibasic, and the total of the two compounds is 10 parts by weight.

From Table 5, according to the formaldehyde scavengers of Examples 11 and 12, it is clear that when they were applied to the wood material of F***, excellent formaldehyde scavenging performance can be obtained without discoloring the wood material, and at the same time, reemission of formaldehyde can be suppressed. On the other hand, according to the formaldehyde scavengers of Comparative Examples 8 and 9, it is clear that the wood material is not discolored and reemission of formaldehyde can be suppressed, but the formaldehyde scavenging performance is lower than that of the formaldehyde scavengers of Examples 11 and 12.

The invention claimed is:

1. A composition for treating wood comprising a formaldehyde scavenger,
    said formaldehyde scavenger comprising urea and an ammonium salt composition in an amount effective to suppress formaldehyde reemission from said wood,
    said ammonium salt composition comprising ammonium phosphate monobasic and ammonium phosphate dibasic in a ratio which is effective to reduce discoloration of said wood.

2. The composition for treating wood according to claim 1, wherein the formaldehyde scavenger comprises urea, ammonium phosphate monobasic and ammonium phosphate dibasic in a weight ratio of urea/ammonium phosphate monobasic/ammonium phosphate dibasic in the range of 5 to 45/0.5 to 15/1 to 20.

3. The composition for treating wood according to claim 1, wherein the formaldehyde scavenger comprises urea, ammonium phosphate monobasic and ammonium phosphate dibasic in a weight ratio of urea/ammonium phosphate monobasic/ammonium phosphate dibasic in the range of 10 to 35/1 to 10/2 to 15.

4. The composition for treating wood according to claim 1, prepared by dissolving or dispersing the formaldehyde scavenger in water.

5. A wood material prepared by applying thereto a formaldehyde scavenger comprising urea, ammonium phosphate monobasic and ammonium phosphate dibasic;
    wherein ammonium phosphate monobasic and ammonium phosphate dibasic are present in a ratio which is effective to reduce discoloration of said wood material.

6. The wood material according to claim 5, wherein the wood material is prepared by applying the formaldehyde scavenger thereto so that a dry weight is in the range of 1 to 50 g/m$^2$.

7. The wood material according to claim 5, wherein the formaldehyde scavenger comprises urea, ammonium phosphate monobasic and ammonium phosphate dibasic in a weight ratio of urea/ammonium phosphate monobasic/ammonium phosphate dibasic in the range of 5 to 45/0.5 to 15/1 to 20.

8. The wood material according to claim 5, wherein the formaldehyde scavenger comprises urea, ammonium phosphate monobasic and ammonium phosphate dibasic in a weight ratio of urea/ammonium phosphate monobasic/ammonium phosphate dibasic in the range of 10 to 35/1 to 10/2 to 15.

* * * * *

UNITED STATES PATENT AND TRADEMARK OFFICE
CERTIFICATE OF CORRECTION

PATENT NO.           : 8,389,125 B2
APPLICATION NO.      : 13/000982
DATED                : March 5, 2013
INVENTOR(S)          : Ichiro Fujii et al.

It is certified that error appears in the above-identified patent and that said Letters Patent is hereby corrected as shown below:

In the Claims:

Col. 14, lines 14 and 15 change "monobasiciammonium" to "monobasic/ammonium"

Signed and Sealed this
Sixteenth Day of April, 2013

Teresa Stanek Rea
*Acting Director of the United States Patent and Trademark Office*